(12) United States Patent
Nguyen

(10) Patent No.: US 6,268,762 B1
(45) Date of Patent: Jul. 31, 2001

(54) OUTPUT STAGE FOR A CHARGE PUMP AND A CHARGE PUMP MADE THEREBY

(75) Inventor: Hung Nguyen, Fremont, CA (US)

(73) Assignee: Silicon Storage Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/507,220

(22) Filed: Feb. 18, 2000

(51) Int. Cl.[7] ........................................ G05F 1/10
(52) U.S. Cl. ............................................. 327/536
(58) Field of Search .................... 327/530, 534, 327/535, 536; 363/59, 60

(56) References Cited

U.S. PATENT DOCUMENTS

| | | | |
|---|---|---|---|
| 5,734,290 | * 3/1998 | Chang et al. | 327/536 |
| 5,818,289 | * 10/1998 | Chevallier et al. | 327/536 |
| 6,016,073 | * 1/2000 | Ghilardelli et al. | 327/536 |
| 6,172,886 | * 1/2001 | Lauterbach et al. | 363/60 |

* cited by examiner

Primary Examiner—Jeffrey Zweizig
(74) Attorney, Agent, or Firm—Gray Cary Ware & Friedenrich LLP

(57) ABSTRACT

In a two-clock charge pump an improved output stage minimizes the voltage swing at the output node. The output stage has a first and second MOS transistors whose first terminals are connected together to receive the input signal. The second terminal of the first MOS transistor is connected to the gate of the second MOS transistor. The second terminal of the second MOS transistor is connected to the output node. A first and second clock signals are supplied to the gates of the first and second MOS transistors. Diode means in the nature of an MOS transistor having a gate connected to one of its terminals are provided connecting the output node to the gate of the first MOS transistor.

13 Claims, 5 Drawing Sheets

OUTPUT STAGE FOR A CHARGE PUMP AND A CHARGE PUMP MADE THEREBY

TECHNICAL FIELD OF THE INVENTION

The present invention relates to an output stage for a charge pump and more particularly to a charge pump with such an output stage having minimal voltage swings due to the output loading.

BACKGROUND OF THE INVENTION

Charge pumps are well known in the art. Charge pumps are electrical circuits which receive a low voltage as an input and generate a high voltage as an output. Charge pumps are used in non-volatile memory arrays to generate the necessary high voltage for erase or programming operations.

Referring to FIG. 1 there is shown a block level diagram of a charge pump 10 of the prior art. A typical charge pump 10 of the prior art comprises a first stage 12 for receiving the input voltage Vcc and for generating an output voltage which is supplied to a plurality of serially connected alternating pumps 20a and 20b. Thus, the output of the initial stage 12 is supplied as an input to a first stage 20a to which clock signal C1 and C2A are supplied. The output of the first pump stage 20a is supplied as an input to the second pump stage 20b to which clock signals C2 and C1A are supplied. The output of the second pump stage 20b is then supplied as input to yet another serially connected first pump stage 20a and so on. The last stage 16 of the charge pump 10 is either the charge pump 20a or 20b with the output as the output of charge pump 10.

Referring to FIG. 2, there is shown a detailed circuit diagram of the initial stage 12 of the charge pump 10 of the prior art. The initial stage 12 simply comprises an NMOS transistor having its gate connected to one of the terminals to the input voltage Vcc. The output of the initial stage is the second terminal of the NMOS transistor.

Referring to FIGS. 3 and 4, there is shown a detailed circuit diagram of the charge pump stages 20a and 20b. Each of the pump stages 20a and 20b are identical in circuit. The only difference between the stages 20a and 20b is the clock signals supplied thereto. Thus, as shown in FIG. 3, the charge pump stage 20a comprises an NMOS transistor 22a having a first terminal and a second terminal with a channel therebetween. A gate controls the flow of current between the first terminal and the second terminal. The first terminal of the NMOS transistor 22a is connected to the input. A second NMOS transistor 24a also comprises a first terminal and a second terminal with a channel therebetween. A gate controls the flow of current between the first terminal and the second terminal. The first terminal of the second NMOS transistor 24a is also connected to the input. The second terminal of the first NMOS transistor 22a is connected to the gate of the second NMOS transistor 24a. The second terminal of the second NMOS transistor 24a is connected to the output. The charge pump stage 20a also comprises a third NMOS transistor 26a having its first and second terminals connected together to receive the clock signal C1. The gate of the third NMOS transistor 26a is connected to the output and to the gate of the first NMOS transistor 22a. Finally, the first pump stage 20a also comprises a fourth NMOS transistor 28a. The first and second terminals of the fourth NMOS transistor 28a are connected together and receive the clock signal C2A. The gate of the fourth NMOS transistor 28a is connected to the gate of the second NMOS transistor 24a.

In like manner, the second pump stage 20b comprises a first, a second, a third, and a fourth NMOS transistors 22b, 24b, 26b, and 28b, respectively, and all as connected in the manner for the first charge pump stage 20a, shown in FIG. 3. As previously discussed, the only difference between the second charge pump stage 20b and the first charge pump stage 20a is the clock signal. In the second charge pump stage 20b, clock signal C2 is supplied to the first and second terminal of third NMOS 26b. A clock signal C1A is supplied to the first and second terminals of the fourth NMOS transistor 28b.

The charge pump 10 of the prior art receives two clock signals C1, C2, C1A, C2A whose waveforms are shown in FIG. 5.

The problem with the charge pump 10 of the prior art is that with either the first pump stage 20a or the second stage 20b as the last stage 16 of the charge pump 10, the voltage output of the charge pump 10 with a load has a swing in the voltage output, as shown in FIG. 6.

SUMMARY OF THE INVENTION

In the present invention, an output stage for a two-clock charge pump receives a first signal as an input. A first MOS transistor has a first terminal and a second terminal with a channel therebetween and a gate to control the flow of the current therebetween. A second NMOS transistor has a first terminal and a second terminal with a channel therebetween and a gate to control the flow of the current therebetween A first diode means has a first terminal and a second terminal. A second diode means has a first terminal and a second terminal. The first terminal of the first MOS transistor is connected to the first terminal of the second MOS transistor and is connected to the input to receive the first signal. The gate of the first MOS transistor is connected to the first terminal of the first diode means and to the second terminal of the second diode means and receives a first clock signal. The second terminal of the first MOS transistor is connected to the gate of the second MOS transistor and receives a second clock signal. The second terminal of the second MOS transistor is connected to the second terminal of the first diode means and to the first terminal of the second diode means and supplies an output signal of the output stage.

The present invention also relates to a charge pump having the foregoing output stage.

DETAILED DESCRIPTION OF THE DRAWINGS

Figure 7:
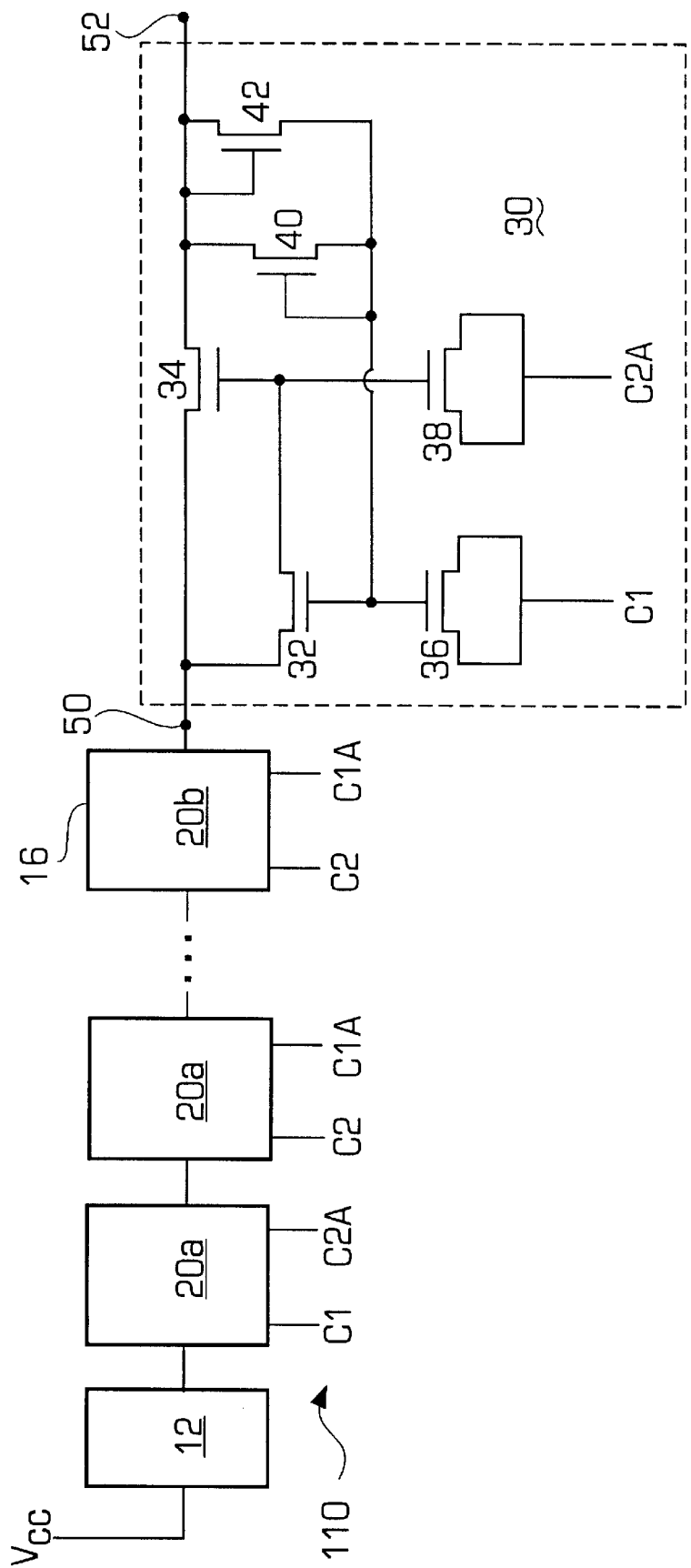
FIG. 7 is a schematic circuit diagram of an improved charge pump of the present invention with an improved output stage.

Referring to FIG. 7 there is shown an improved charge pump 110 of the present invention, including a detailed circuit diagram of an output stage 30 of the present invention.

Figure 1:
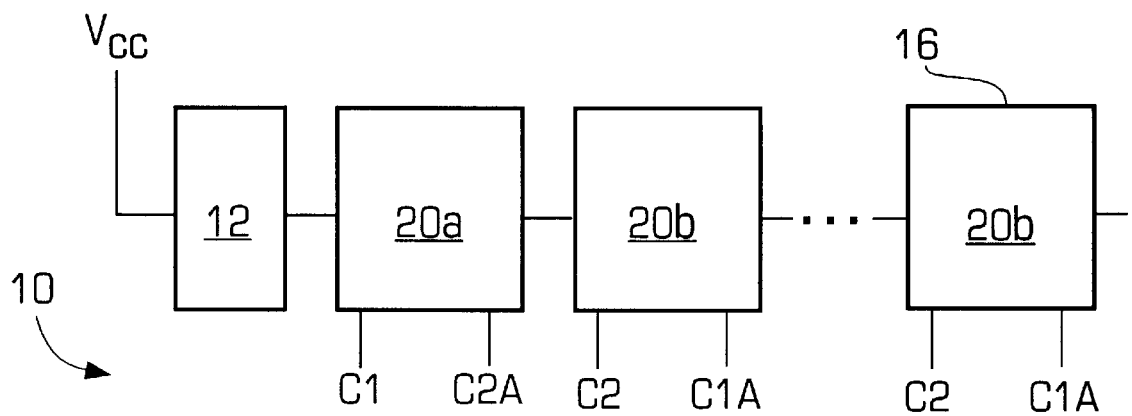
FIG. 1 is a schematic block level diagram of a charge pump of the prior art.
Figure 2:
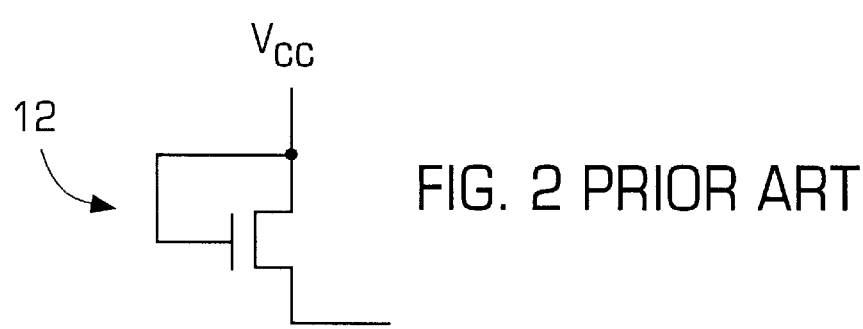
FIG. 2 is a detailed circuit diagram of the initial stage of the charge pump of the prior art shown in FIG. 1.
Figure 3:
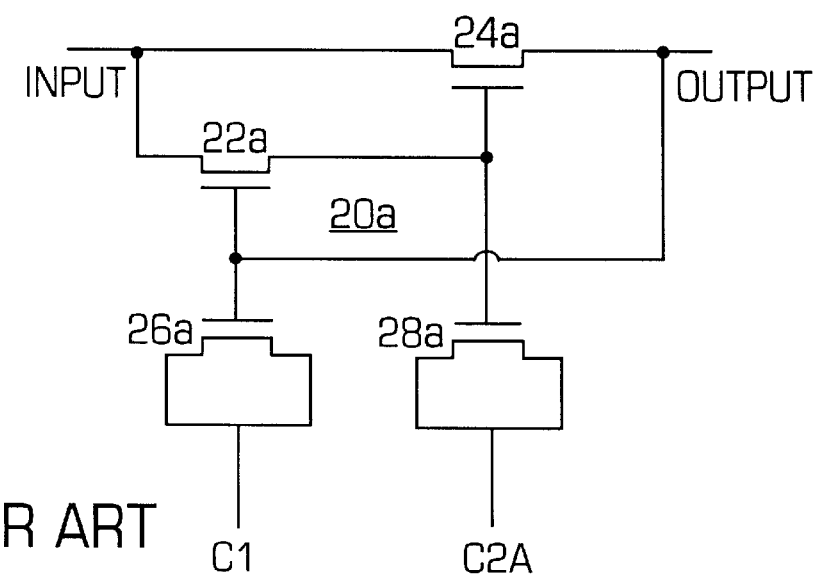
FIG. 3 is a detailed circuit diagram of the first stage of the charge pump of the prior art shown in FIG. 1.
Figure 4:
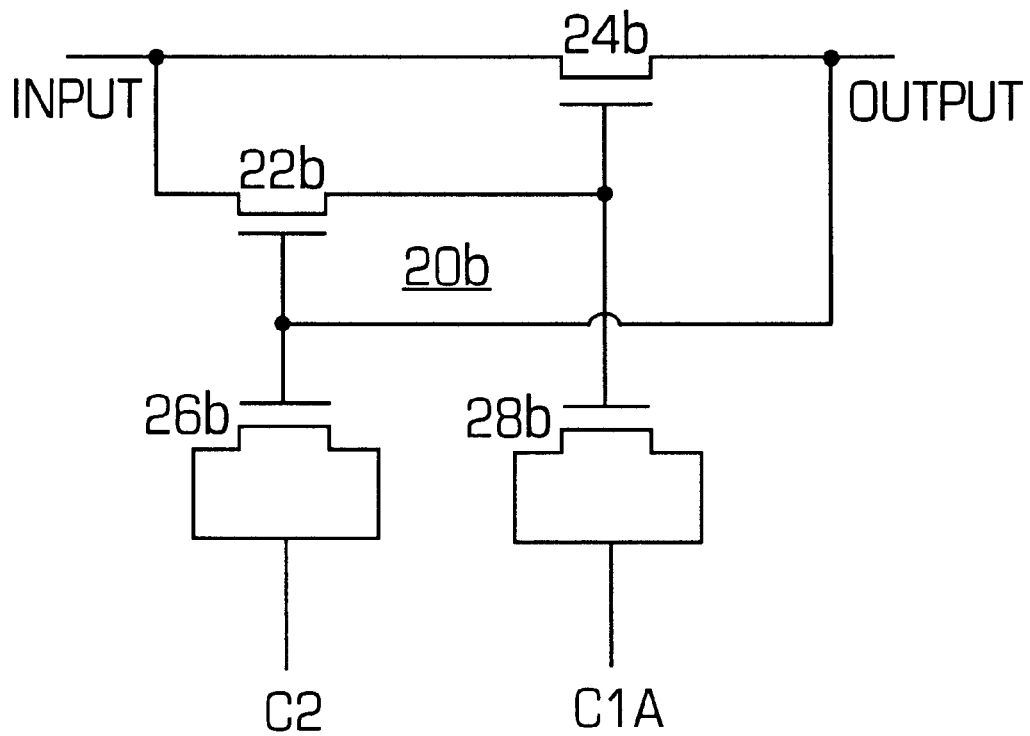
FIG. 4 is a detailed circuit diagram of the second stage of a charge pump of the prior art shown in FIG. 1.
Figure 5:
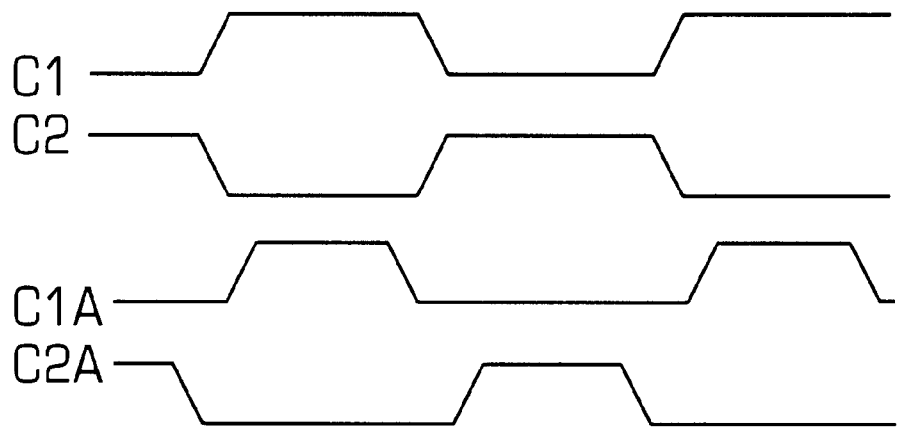
FIG. 5 is a waveform of the clock signals supplied to the charge pump of the prior art and to the charge pump of the present invention.
Figure 6:
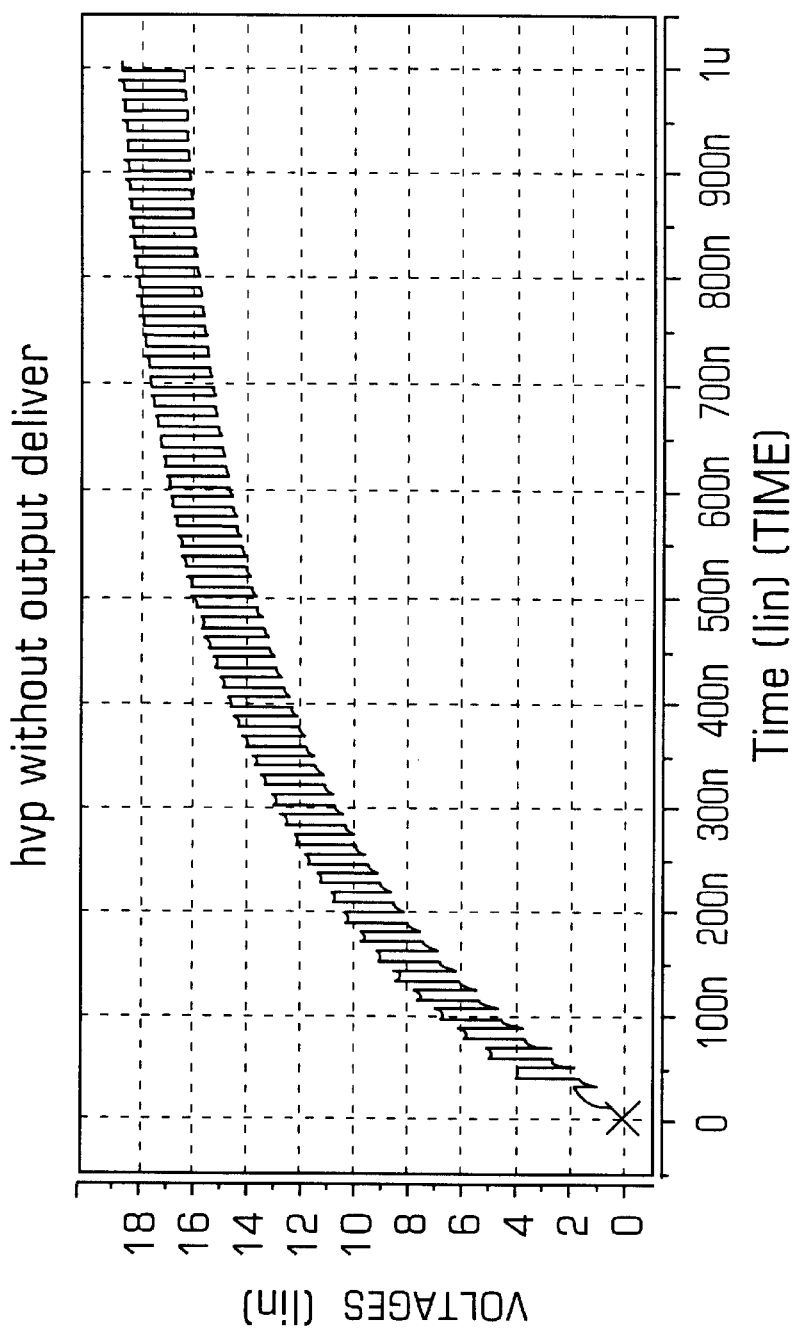
FIG. 6 is a graph of time vs. voltage showing the output of the charge pump of the prior art shown in FIG. 1.

The improved charge pump 110 of the present invention, similar to the charge pump 10 of the prior art, comprises an initial stage 12 for receiving the voltage Vcc and for generating an output voltage in response thereto. The output voltage from the initial stage 12 is supplied to a plurality of serially connected charge pump stages 20a and 20b. Each of the charge pump stages 20a and 20b is shown in FIGS. 3 and 4, respectively. Further, each of the charge pump stages 20a and 20b receives the clock signals C1, C2A, and C2, C1A, respectively. Thus, the improved charge pump 110 is a two-clock charge pump.

From the last charge pump stage 16, the output signal at node 50 is supplied to the output stage 30 of the present invention. At node 50, the output signal from the output stage 16 is supplied as an input to the output stage 30. The output stage 30 has a first MOS transistor 32 having a first terminal, and a second terminal with a channel therebetween and a gate for controlling the flow of current therebetween. The output stage 30 further has a second MOS transistor 34 having a first terminal and a second terminal with a channel therebetween and a gate to control the flow of current flow therebetween. The first terminal of the first MOS transistor 32 and the first terminal of the second MOS transistor 34 are connected to the input node 50. The second terminal of the first MOS transistor 32 is connected to the gate of the second MOS transistor 34. The second terminal of the second MOS transistor 34 supplies the output signal at node 52 from the output stage 30 which is also the output signal from the charge pump 110.

Similar to the first output stage 20a or second output stage 20b, the output stage 30 also comprises a third MOS transistor 36 having its first and second terminals connected together to receive the clock signal C1. The gate of the third MOS transistor 36 is connected to the gate of the first MOS transistor 32. In addition, a fourth MOS transistor having a first and second terminals connected together receives the second clock signal C2A. The gate of the fourth MOS transistor 38 is connected to the gate of the second MOS transistor 34, which of course, is also connected to the second terminal of the first MOS transistor 32.

Finally, the output stage 30 comprises a first diode means 40 which is a fifth MOS transistor 40. The fifth MOS transistor 40 has its gate and first terminal connected together to the gate of the first MOS transistor 32 and its second terminal connected to the output node 52. The output stage 30 also comprises a second diode means 42 which is another MOS transistor 42 having its gate and first terminal connected together at the output node 52 with its second terminal connected to the gate of the first MOS transistor 32. Therefore, in this manner each of the transistors 40 and 42 with gates connected to one of its respective terminals operates as a diode.

Figure 8:
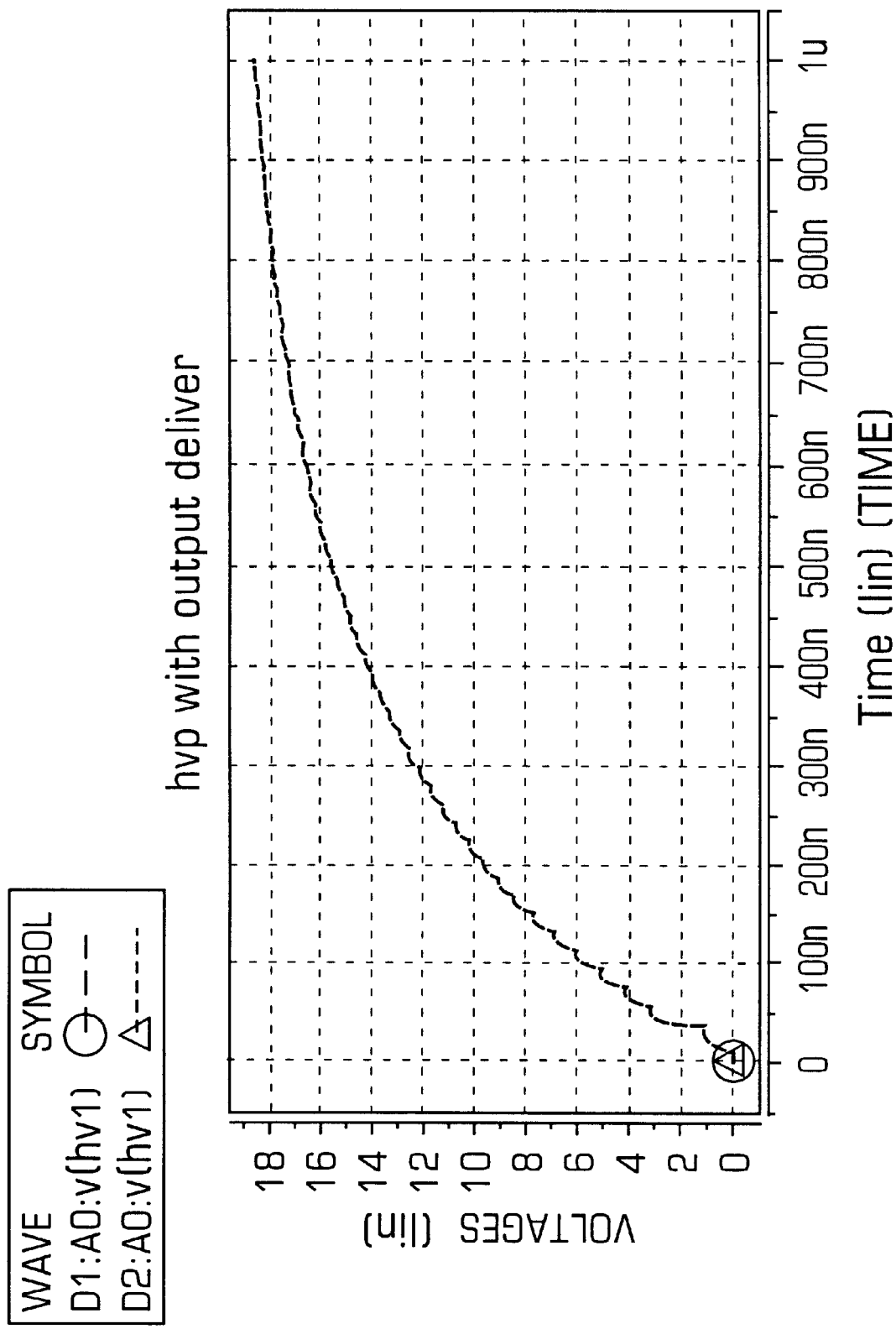
FIG. 8 is a graph of time vs. voltage showing the output of the improved charge pump of the present invention.

Referring to FIG. 8, there is shown a graph of voltage vs. time of the output of the charge pump 110 at the output node 52. As can be seen from FIG. 8, there voltage swing at the output node 52 is greatly reduced.

The theoretical basis of the present invention is believed as follows: the output stage 30 acts as a "dummy output" which reduces the swing of the output voltage. The "dummy output" of the output stage 30 is synchronized with the pumping clocks of C1 and C2A. When the pumping clock C1 is high, the third transistor 36 is also high, thereby turning on the first transistor 32. This in turn turns on second MOS transistor 34 which causes the voltage from the input node 50 to be supplied as the output node 52. At this time, the clock signal C2A is low.

Therefore, the voltage at the node 52 is still possible to be lower than that at node 50 by a threshold of the transistor 34. When the clock C2A is high, coupling the gate of the transistor 34 higher, it allows the charge of node 50 to be completely transferred to node 52. After that, the clock C2A will go down, thereby turning the transistor 34 off to avoid backward flow from node 52 while the previous stage delivers charge to node 50. The transistor 42 is used to precharge the node 54 for the next cycle. The transistor 40 is used for discharging node 52 when the pump is turned off.

Thus, from the foregoing, it can be seen that the improved output stage 30 of the present invention or the improved charge pump 110 of the present invention causes very little, if any, voltage swing at the output thereby stabilizing the high voltage which can be delivered to other parts of the circuit.

What is claimed is:

1. An output stage for a two-clock charge pump having a first signal as its output, said output stage comprising:

an input for receiving said first signal as an input thereof;

a first MOS transistor having a first terminal, and a second terminal with a channel therebetween, and a gate for controlling the flow of current therebetween;

a second MOS transistor having a first terminal, and a second terminal with a channel therebetween, and a gate for controlling the flow of current therebetween;

a first diode means having a first terminal and a second terminal;

a second diode means having a first terminal and a second terminal;

said first terminal of said first MOS transistor connected to said first terminal of said second MOS transistor and to said input;

said gate of said first MOS transistor connected to said first terminal of said first diode means and to said second terminal of said second diode means and for receiving a first clock signal;

said second terminal of said first MOS transistor connected to said gate of said second MOS transistor and for receiving a second clock signal; and said second terminal of said second MOS transistor connected to said second terminal of said first diode means and to said first terminal of said second diode means and for supplying an output signal of said output stage.

2. The output stage of claim 1 wherein said first diode means is a third MOS transistor having a first terminal and a second terminal with a channel therebetween, and a gate for controlling the flow of current therebetween; with said gate connected to said first terminal, and said first terminal of said third MOS transistor as said first terminal of said first diode means and said second terminal of said third MOS transistor as said second terminal of said first diode means.

3. The output stage of claim 2 wherein said second diode means is a fourth MOS transistor having a first terminal and a second terminal with a channel therebetween, and a gate for controlling the flow of current therebetween; with said gate connected to said first terminal, and said first terminal of said fourth MOS transistor as said first terminal of said second diode means and said second terminal of said fourth MOS transistor as said second terminal of said second diode means.

4. The output stage of claim 3 further comprising:

a fifth MOS transistor having a first terminal and a second terminal with a channel therebetween, and a gate for controlling the flow of current therebetween;

said first terminal connected to said second terminal and for receiving said first clock signal; and said gate connected to said gate of said first MOS transistor.

5. The output stage of claim 4 further comprising:

a sixth MOS transistor having a first terminal and a second terminal with a channel therebetween, and a gate for controlling the flow of current therebetween;

said first terminal connected to said second terminal and for receiving said second clock signal; and said gate connected to said gate of said second MOS transistor.

6. A charge pump comprising:

a plurality of substantially identical stages serially connected together, each stage for receiving an input signal having a first voltage and for generating an output signal having a second voltage, higher than said first voltage; wherein each stage for receiving a first clock signal and a second clock signal, with said output signal of one stage supplied as an input signal to an adjacent stage;

an output stage for receiving the output signal of said plurality of stages, said output stage comprising:

an input for receiving said output signal as an input thereof;

a first MOS transistor having a first terminal, and a second terminal with a channel therebetween, and a gate for controlling the flow of current therebetween;

a second MOS transistor having a first terminal, and a second terminal with a channel therebetween, and a gate for controlling the flow of current therebetween;

a first diode means having a first terminal and a second terminal;

a second diode means having a first terminal and a second terminal;

said first terminal of said first MOS transistor connected to said first terminal of said second MOS transistor and to said input;

said gate of said first MOS transistor connected to said first terminal of said first diode means and to said second terminal of said second diode means and for receiving a first clock signal;

said second terminal of said first MOS transistor connected to said gate of said second MOS transistor and for receiving a second clock signal; and said second terminal of said second MOS transistor connected to said second terminal of said first diode means and to said first terminal of said second diode means and for supplying an output signal of said output stage.

7. The output stage of claim 6 wherein said first diode means is a third MOS transistor having a first terminal and a second terminal with a channel therebetween, and a gate for controlling the flow of current therebetween; with said gate connected to said first terminal, and said first terminal of said third MOS transistor as said first terminal of said first diode means and said second terminal of said third MOS transistor as said second terminal of said first diode means.

8. The output stage of claim 7 wherein said second diode means is a fourth MOS transistor having a first terminal and a second terminal with a channel therebetween, and a gate for controlling the flow of current therebetween; with said gate connected to said first terminal, and said first terminal of said fourth MOS transistor as said first terminal of said second diode means and said second terminal of said fourth MOS transistor as said second terminal of said second diode means.

9. The output stage of claim 8 further comprising:

a fifth MOS transistor having a first terminal and a second terminal with a channel therebetween, and a gate for controlling the flow of current therebetween;

said first terminal connected to said second terminal and for receiving said first clock signal; and said gate connected to said gate of said first MOS transistor.

10. The output stage of claim 9 further comprising:

a sixth MOS transistor having a first terminal and a second terminal with a channel therebetween, and a gate for controlling the flow of current therebetween;

said first terminal connected to said second terminal and for receiving said second clock signal; and said gate connected to said gate of said second MOS transistor.

11. The charge pump of claim 6 wherein each of said plurality of stages comprises:

a third MOS transistor having a first terminal and a second terminal with a channel therebetween, and a gate for controlling the flow of current therebetween;

a fourth MOS transistor having a first terminal and a second terminal with a channel therebetween, and a gate for controlling the flow of current therebetween;

said first terminal of said third MOS transistor connected to said first terminal of said fourth MOS transistor and for receiving said input signal;

said gate of said third MOS transistor connected to said second terminal of said fourth MOS transistor and for receiving said first clock signal;

said second terminal of said third MOS transistor connected to said gate of said fourth MOS transistor and for receiving said second clock signal; and wherein said second terminal of said fourth MOS transistor providing said output signal.

12. The charge pump of claim 11 wherein each of said plurality of stages further comprises:

a fifth MOS transistor having a first terminal and a second terminal with a channel therebetween, and a gate for controlling the flow of current therebetween;

said first terminal connected to said second terminal and for receiving said first clock signal; and said gate connected to said gate of said third MOS transistor.

13. The charge pump of claim 12 wherein each of said plurality of stages further comprises:

a sixth MOS transistor having a first terminal and a second terminal with a channel therebetween, and a gate for controlling the flow of current therebetween;

said first terminal connected to said second terminal and for receiving said second clock signal; and said gate connected to said gate of said fourth MOS transistor.

* * * * *